Jan. 4, 1949.  M. C. VOLKMANN ET AL  2,458,324

VENTILATOR

Filed Jan. 1, 1945

CLARENCE A. JOHNSON +
MAURICE C. VOLKMANN.
INVENTORS.

BY Oltsch & Knoblock

ATTORNEYS.

Patented Jan. 4, 1949

2,458,324

UNITED STATES PATENT OFFICE 2,458,324

VENTILATOR

Maurice C. Volkmann and Clarence A. Johnson, Elkhart, Ind., said Johnson assignor to said Volkmann Application January 1, 1945, Serial No. 570,960

2 Claims. (Cl. 98—20)

This invention relates to improvements in ventilators. The invention is particularly adapted for use on vehicles such as house trailers, buses and the like.

The primary object of the invention is to provide a device of this character which is simple in construction, easy to install and easy to adjust and operate.

A further object is to provide a device of this character which can be adjusted to take advantage of the wind, regardless of its direction, to produce movement of air therethrough.

A further object is to provide a device of this character which covers an opening in the roof deck of a vehicle and is so constructed that snow or rain is prevented from entering the trailer therethrough while it is open.

A further object is to provide a device of this character which can be sealed to prevent escape of heat from the vehicle in cold weather.

A further object is to provide a device of this character having a plurality of closure elements and simple and novel means for operating said elements.

Other objects will be apparent from the description and appended claims.

Figure 1:
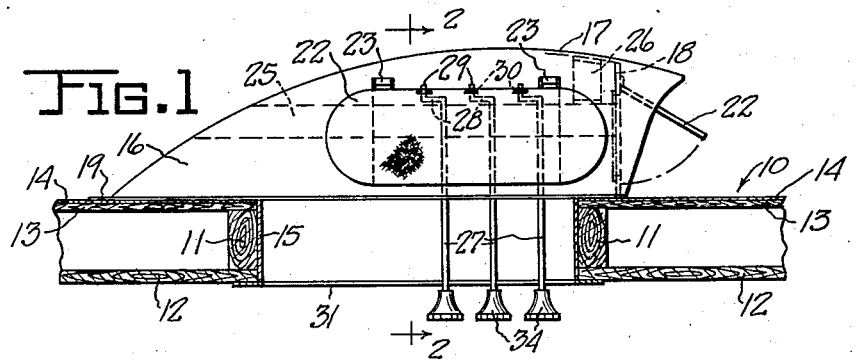
Fig. 1 is a side view of the device mounted upon a vehicle roof deck shown in section.
Figure 2:
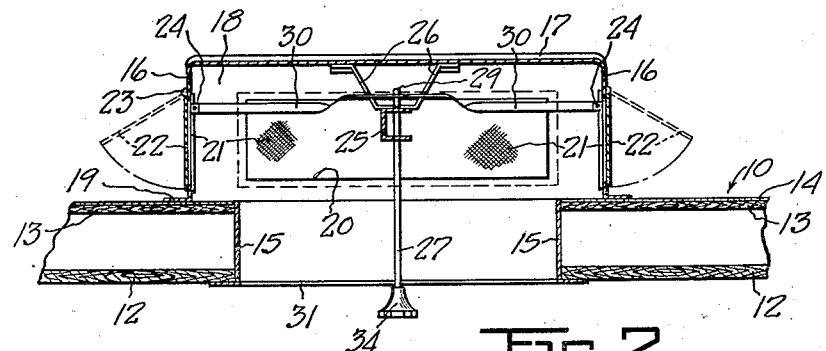
Fig. 2 is a transverse vertical sectional view taken on line 2—2 of Fig. 1.
Figure 3:
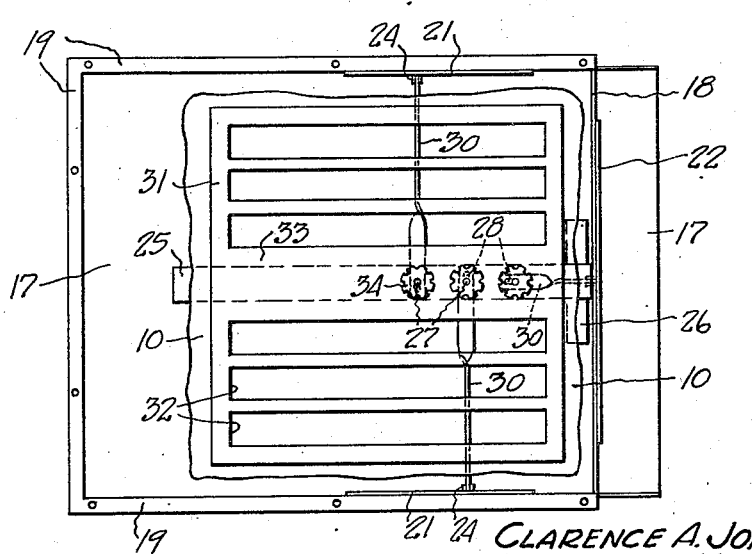
Fig. 3 is a bottom plan view of the device as installed, with the roof deck broken away to expose the upper part of the device.

Referring to the drawing, which illustrates the preferred embodiment of the invention, the numeral 10 designates the roof or deck of a vehicle, such as a house trailer, bus or the like. The roof is illustrated as formed with transverse bows or studding 11, an interior ceiling panel 12 secured to said bows, and a plywood or like outer panel 13 covered with weatherproof sheet material 14. An opening is formed in the roof 10 at the point at which the ventilator is to be positioned, and this opening is lined with panels 15, such as composition board, to seal and maintain a dead air space within the hollow roof structure.

The ventilator is secured to the roof to cover said ventilation opening. The ventilator comprises a hood member having vertical side walls 16 with curved upper portions or edges which taper to a point at their front ends. A top panel 17 spans the upper edges of the side walls and is longitudinally curved as illustrated in Fig. 1 with its front edge engaging deck 10 and its rear edge spaced above said deck. A vertical rear end wall 18 closes the rear of the hood and is preferably positioned forwardly relative to the rear edges of the side walls and top panel. The hood has marginal flanges 19 by means of which it is secured to the roof deck. The hood member is preferably of a size such that it engages the roof in outwardly spaced relation to the edges of the ventilating roof opening.

Each of the side walls 16 and end wall 18 has an opening 20 therein which is preferably spanned by screen material 21 permanently secured to said hood member. A closure plate 22 is pivoted at 23 at its upper edge above each of said openings 20. A bracket 24 is secured to each closure plate 22 adjacent its upper end and projects inwardly therefrom, preferably passing through an opening in screen 21.

A channel 25 extends longitudinally within the hood member, being secured to said hood at the rear thereof by a bracket 26, and being welded or otherwise secured to or supported by the top panel 17 at its front end. Channel 25 is preferably supported with its upper edge slightly below the top edges of openings 20 and brackets 24. A plurality of vertical rods 27 are journaled in the upper and lower flanges of channel 25 in spaced relation. The upper end portions of rods 27 are bent laterally at 28 and may bear upon the upper surface of channel 25 to support or suspend said rods relative to said channel. The terminal portions 29 of rods 27 extend parallel to the rods in off-set relation to form cranks. A plurality of links 30, which are preferably twisted intermediate their ends, are pivotally connected at their outer ends to the respective brackets 24 and may be apertured at their inner ends to fit snugly but rotatably around crank portions 29 of the respective rods 27. Suitable means, such as a cotter pin, prevents displacement of said links from said rods. It will be understood that the number of rods and links will preferably equal the number of closures 22, so that separate operating means will be provided for each closure; but this individual control is not essential, and a single rod may have all links connected thereto, as by means of a spider (not shown) to form a single control for all closures.

A grill 31 is preferably secured to the inner deck panel 12 to span the ventilation opening, for decorative purposes. Grill 31 has a plurality of openings 32 therein accommodating free passage of air therethrough, and has a central web 33 parallel to and vertically aligned with channel 25. This web has openings therein snugly and rotatably receiving and positioning the lower ends of rods 27. Each rod 27 preferably mounts an operating knob 34 at its lower end adjacent to and below the grill 31.

The parts of the closure operating means are so proportioned that when the crank portion of the rod is aligned with and extends diametrically oppositely to the closure, i. e., away from the closure, the parts will be tensioned to seal the closure. In this connection, the rotation of the parts toward full locking position entails a wedge-like binding action which prevents accidental release of the parts incident to movement of the vehicle over rough roads. At the opposite aligned position of the crank and link, the closure is held in its open position as illustrated, preferably inclined approximately 60° from the vertical. In this open position, the closure shields the opening effectively, particularly when it is somewhat larger than the opening.

It will be apparent that when the vehicle is traveling with the rear closure 22 open, a suction will be created which will draw air from the vehicle interior for ventilation purposes. Likewise, when the vehicle, such as a house trailer, is parked, one or more of the closures may be opened according to the direction of the wind, to take full advantage of such prevailing conditions for the purpose of creating a draft which will cause a flow of air in either an inward or an outward direction, as may be desired.

The device possesses many additional advantages for its intended purpose. Thus the construction is simple and comparatively inexpensive. The shape and construction of the hood member and the relation thereof to the ventilation opening effectively prevent leakage of snow or rain into the vehicle when the ventilator is open, so that ventilation can be obtained in adverse weather conditions. The device is easy to install, and presents a pleasing and unobtrusive appearance from both the exterior and interior of the vehicle. The three-point rotatable connection and support of the operating rods provides a sturdy construction, and the operating knobs are readily accessible but out of the way.

We claim:

1. A ventilator adapted to be mounted on the roof of a vehicle at a ventilating opening, comprising a hood member having upright side and rear walls and a forwardly inclined member forming a top and front, said upright walls each having an opening, a closure for each wall opening, pivoted at its upper edge above said opening, a rigid bracket secured to said top and positioned within said hood, said bracket including an elongated member having a pair of vertically spaced substantially horizontal rigid web portions, each having a plurality of apertures substantially vertically aligned with apertures in the other web portion, and a plurality of closure operators each including an operating member journaled in one set of aligned web apertures and extending downwardly through said roof opening.

2. A ventilator adapted to be mounted on the roof of a vehicle at a ventilating opening, comprising a hood member having upright side and rear walls and a forwardly inclined member forming a top and front, said upright walls each having an opening, a closure for each wall opening pivoted at its upper edge above said opening, a bracket secured within and adjacent to the top of said hood, said bracket including a rigid channel member having a pair of spaced parallel horizontal flanges, said flanges having vertically and axially aligned apertures therein, and a plurality of closure operators each including an elongated operating member journaled in a pair of aligned flange apertures and extending downwardly through said roof opening, and a grill adapted to span said roof opening at the inner surface of said roof and having apertures journaling said operating members in spaced relation and below said bracket.

MAURICE C. VOLKMANN.
CLARENCE A. JOHNSON.

REFERENCES CITED

The following references are of record in the file of this patent:

UNITED STATES PATENTS

| Number | Name | Date |
|---|---|---|
| 600,975 | Andrew | Mar. 22, 1898 |
| 793,982 | Bonnett | July 4, 1905 |
| 932,659 | Welker | Aug. 31, 1909 |
| 1,070,312 | Wilson | Aug. 12, 1913 |
| 1,071,729 | Garland | Sept. 2, 1913 |
| 1,128,166 | Manning | Feb. 9, 1915 |
| 1,389,788 | Steger | Sept. 6, 1921 |
| 1,575,126 | Peterman | Mar. 2, 1926 |
| 1,713,870 | Havens | May 21, 1929 |
| 1,670,784 | Schuetz | May 22, 1928 |
| 1,742,185 | Bourke | Jan. 7, 1930 |
| 2,089,060 | Harley | Aug. 3, 1937 |
| 2,372,164 | Woodhams | Mar. 20, 1945 |

FOREIGN PATENTS

| Number | Country | Date |
|---|---|---|
| 156,235 | Germany | Nov. 10, 1904 |